United States Patent [19]

van der Werff

[11] Patent Number: 5,574,095
[45] Date of Patent: Nov. 12, 1996

[54] METHOD FOR PRODUCING ASPHALTS CONTAINING AN EPOXY-CONTAINING POLYMER AND POLYAMINE

[75] Inventor: Johannes C. van der Werff, Sugarland, Tex.

[73] Assignee: Shell Oil Company, Houston, Tex.

[21] Appl. No.: 431,239

[22] Filed: Apr. 28, 1995

[51] Int. Cl.$^6$ .................................................. C08L 95/00
[52] U.S. Cl. .......................... 525/54.5; 527/500; 527/501
[58] Field of Search .................... 525/54.5; 527/500, 527/501

[56] References Cited

U.S. PATENT DOCUMENTS

| | | | |
|---|---|---|---|
| 2,824,078 | 2/1958 | Mellick | 525/54.5 |
| 3,015,635 | 1/1962 | Bradley | 527/501 |
| 3,284,390 | 11/1966 | Scheibli | 527/501 |
| 4,499,215 | 2/1985 | Okada | 525/54.5 |
| 5,306,750 | 4/1994 | Goodrich et al. | |
| 5,371,121 | 12/1994 | Bellomy et al. | |

*Primary Examiner*—D. R. Wilson

[57] ABSTRACT

A method of making an asphalt composition including mixing an asphalt base, a epoxy-functionalized polymer, and then a polyamine, thereby producing a final asphalt composition; and recovering said final asphalt composition.

14 Claims, No Drawings

METHOD FOR PRODUCING ASPHALTS CONTAINING AN EPOXY-CONTAINING POLYMER AND POLYAMINE

FIELD OF THE INVENTION

The invention relates to a method of making an asphalt composition, especially an asphalt composition suitable for road construction.

BACKGROUND OF THE INVENTION

Asphalts are used in road construction. Asphalts containing polymers are known, The polymers are used to increase performance over a broad temperature range. That is, the asphalt in road usage, will not be too soft and malleable at high temperatures or too brittle at low temperatures. However, polymers are expensive. Thus it would be desirable to have an asphalt composition giving the desired performance over the desired temperature range with less polymer content.

SUMMARY OF THE INVENTION

A method of making an asphalt composition including mixing an asphalt base, an epoxy-or glycidyl-functional polymer, and then a polyamine, thereby producing a final asphalt composition; and recovering said final asphalt composition.

DETAILED DESCRIPTION OF THE PREFERRED EMBODIMENTS

A. ASPHALT

A wide variety of asphalts can be utilized in the method of this invention. Such asphalts are described, e.g., in U.S. Pat. No. 5,306,750 column 1, which is incorporated herein by reference. In most cases, asphalt is a bottom product remaining after distillation of the crude oil. In another type of asphalt lighter fractions or less severely distilled bottoms are mixed with a deeply flashed bottom material, to arrive at an asphalt having a desired viscosity or other desired parameters depending on the planned end usage of the asphalt. It is also known to obtain desired asphalt properties by adding aromatic-containing by-products of lubrication oil production. All of the above-disclosed base asphalts are known in the art. The preferred asphalts have a viscosity at 60° C. of 100 to 20,000 poise.

B. MIXING POLYMER WITH ASPHALT

1. Description of Polymers

The polymers used in the method of this invention are described in U.S. Pat. No. 5,306,750, columns 3–5, which is incorporated herein by reference. The polymers are epoxy-functional glycidyl-containing ethylene copolymers having a melt flow index in the range of 0.1 to 2,000 as determined by; ASTM D1238-65T, Condition E. In a preferred embodiment, the copolymer is a terpolymer derived from the concurrent reaction of ethylene, normal butyl acrylate, and a glycidyl ester selected from the group consisting of glycidyl acrylate and glycidyl methacrylate, wherein the glycidyloxy moieties in said terpolymer range from 0.1 to 20 weight % based on the total weight of said terpolymer.

2. Mixture of the Polymer

The polymer is mixed with the asphalt at conditions as described in U.S. Pat. No. 5,306,750, columns 5–8, which is incorporated herein by reference. For purposes of this patent specification and claim, the mixture resulting from the mixture of asphalt and polymer is termed the first asphalt mixture. The polymer produced is a polyepoxy polymer-linked asphalt thermoplastic composition, wherein substantially all of the epoxide moieties are reacted within the polymer-linked asphalt thermoplastic, and wherein the epoxy-functional copolymer is from 0.05 to 20 weight percent, based on the weight of said first asphalt composition. In a preferred embodiment the polymer content of the composition is from 0.5 to 20 weight percent.

C. Mixing Polyamine With Asphalt/Polymer Mixture

1. Polyamines

The polyamines used are not polymers since they only have a low number of repeating units, e.g., about six for a typical ethylene-polyamine. Thus, the molecular weights of the polyamines are relatively low compared to molecular weights of the polymers, since polymers may have 50, 100, or more repeating units and molecular weights in the thousands or tens or hundreds of thousands.

The molecular weight of the polyamine must be such that the boiling point of the polyamine is above that of the temperature of the mixture during reaction. For example for ethylene polyamines, the molecular weight is preferably at least about 140 at reaction temperatures of about 200° C. Typically, ethylene polyamines have weight average molecular weights of from about 60 to about 500. Preferred molecular weight ranges as used in this method are from about 130 to about 300. The temperature at which the polyamine and first asphalt mixture are mixed vary depending on the source of the asphalt and the polymer. The temperature should high enough to ensure adequate mixing without being high enough to cause loss of product. Typical temperatures at which the mixture occurs are from about 100° C. to about 250° C.

A beneficial result of the method and composition of this invention is that less polymer is needed. This is valuable since the polymer greatly increases the production cost. In the method and composition of this invention the weight ratio of polymer to polyamine is typically from about 20:1 to about 1:1. More preferably the weight ratio is from about 10:1 to about 2:1, or from about 7:1 to about 4:1. As noted in the Experimental Section V below, another benefit of the invention is increased asphalt grade levels without increasing the polymer content. For example the final asphalt composition will have a Performance Grade PG asphalt grade level of at least PC70 or PC76. As known in the art, PG grades are specified by AASHTO MP1 as results from AASHTO TP5, which are incorporated herein by reference (AASHTO is the abbreviation commonly used to designate the American Association of State Highway Transportation Officials specifications, adopted in 1924). The PG grade levels indicate the maximum and minimum pavement temperatures for which the asphalt is rated and are usually written as PGXX-YY, where XX is the maximum temperature (° C.) and YY is the minimum temperature (° C.). Herein, only the maximum temperature value, XX, will be given. The increased grade levels represent increased temperature range stability or performance. While the PG grade levels are specifically mentioned, the invention is equally applicable to other standard grade level measurement methods which reflect increased temperature range stability.

D. FINAL ASPHALT COMPOSITION

The method of the invention results in a highly-cross-linked polymer-polyamine- asphalt composition. The invention includes the asphalt described in the method above and a glycidyl-functionalized polymer described in the method. The final asphalt composition additionally includes the non-polymeric polyamine described in the method above.

V. ILLUSTRATIVE EMBODIMENTS AND COMPARATIVE EXAMPLES

A. Experimental Procedure

In the following examples, the asphalt mixtures were measured for change in the high temperature property $G^*/\sin \delta$ (AASHTO TP5). $G^*$ is the complex shear modules of the mixture and $\delta$ is the phase angle between a sinusoidally applied strain and the resultant sinusoidal stress in a controlled-strain testing mode. The value of $G^*/\sin \delta$ defines the resistance to shear deformation (such as rutting) of the asphalt mixture at test temperature, where test temperature is chosen to relate to the temperature experienced by the pavement in the geographical area for which the asphalt mixture is intended. The value is also used to calculate performance-related criteria in accordance with AASHTO MP1 (AASHTO TPS, Section 5).

1. Without Polyamine (Runs 1, 2, and 4)

Asphalt A, an asphalt prepared from a crude oil vacuum distillation residue and a softer oil fraction, graded as AC-20 (AASHTO M226-80(1986), table 2) or PG64-22(AASHTO MP1), was used a base for modification with a glycidyl-functionalized polymer. 200 grams of Asphalt A were heated to 190° C. while stirring under a nitrogen blanket and the glycidyl functionalized polymer (ELVALOY AM, Du Pont) was blended in at this temperature.

Polymer was added at concentrations of 1.0 and 2.0% on weight basis. The asphalt/polymer blends were stirred for 4 hrs at 190° C. under nitrogen. After this treatment the blends were nitrogen blanketed and stored in closed containers at 163° C. for 24 hr. The results for the high temperature property $G^*/\sin \delta$ (AASHTO TP5) at various test temperatures are given in the table, runs 1, 2, and 4. Comparison of these data with those obtained from samples which were stored for more prolonged periods (up to 28 days) showed that the 24 hr storage period was sufficient to complete the polymer/asphalt reaction.

2. With Polyamine (Runs 3 and 5)

In a second set of experiments, 200 grams of Asphalt A were heated to 190° C. whilst stirring under a nitrogen blanket and the glycidyl functionalized polymer (ELVALOY AM, Du Pont) was blended in at this temperature. Polymer concentrations were 1.0 and 2% on weight basis. After the polymer was completely dissolved (typically after 1 hr), Triethylenetetramine (TETA) was added to the asphalt/polymer blend at a concentration of 20% on polymer content.

After homogenizing, the asphalt/polymer/TETA blends were nitrogen blanketed and stored in closed containers for 24 hr at 163° C. The results for $G^*/\sin \delta$ are given in the table, runs 3 and 5.

B. Experimental Results

The table shows the beneficial results of the invention. First, it shows that less polymer can be used to obtain an asphalt grade level increase when a polyamine is added to the asphalt. This is shown in a comparison of runs 1, 2, and 3. An addition of 1.0% polymer in run 2 to the base case in run 1 did not increase the asphalt grade level. However, in run 3 when polyamine was also added with 1.0% polymer, the grade level did increase. .

The results also show that for a fixed amount of polymer an addition of a polyamine and polymer can increase the asphalt grade level more than the addition of polymer alone. This is shown in runs 1,4, and 5. In run 4 an addition of 2.0% polymer increased the base case in run 1 from PG64 to PG70. In comparison, in run 5, the addition of 2.0% polymer and polyamine increased the grade level from PG64 to PG76.

TABLE

|  | Run 1 Asphalt A | Run 2 Asphalt A with 1.0% polymer | Run 3* Asphalt A, 1.0% polymer and 0.2% TETA | Run 4 Asphalt A with 2.0% polymer | Run 5* Asphalt A, 2.0% polymer and 0.4% TETA |
|---|---|---|---|---|---|
| $G^*/\sin\delta$(AASHTO TP5) @ 64° C. | 1.47 kPa | 1.52 kPa | 2.03 kPa | 2.55 kPa |  |
| $G^*/\sin\delta$(AASHTO TP5) @ 70° C. | 0.68 kPa | 0.79 kPa | 1.08 kPa | 1.25 kPa | 1.91 kPa |
| $G^*/\sin\delta$(AASHTO TP5) @ 76° C. |  |  |  |  | 1.08 kPa |
| Grade(AASHTO MP1) | PG64 | PG64 | PG70 | PG70 | PG76 |

*Runs 3 and 5 are according to the invention.

What is claimed is:

1. A method of making an asphalt composition comprising:
   a. admixing an asphalt base and an epoxy-functional glycidyl-containing ethylene copolymer having a melt flow index in the range 0.1 to 2,000 as determined by ASTM D1238-65T, Condition E, thereby producing a first asphalt composition comprising a polyepoxy polymer-linked-asphalt thermoplastic, having a loss tangent of less than 50 at 60° C. and less than 100 at 80° C., wherein substantially all of the epoxide moieties are reacted within the polymer-linked-asphalt thermoplastic and wherein the epoxy-functional copolymer content of said first asphalt composition is from 0.05 to 20 weight percent, based on the weight of said first asphalt composition;

b. admixing a non-polymeric ethylene polyamine with said first asphalt composition at a temperature of mixing in a range of from about 100° C. to about 250° C., wherein the polyamine has a boiling point above the temperature of mixing, thereby producing a final asphalt composition comprising highly-cross-linked polymer-polyamine-asphalt wherein the weight ratio of copolymer to polyamine is from about 20:1 to about 1:1; and c. recovering said final asphalt composition.

2. The method according to claim 1 wherein said non-polymeric ethylene polyamine has a molecular weight from about 130 to about 500.

3. The method according to claim 1 wherein the weight ratio of polymer to polyamine is from about 10:1 to about 2:1.

4. The method according to claim 1 wherein the weight ratio of polymer to polyamine is from about 7:1 to about 4:1.

5. The method according to claim 1 wherein the amount of said copolymer admixed necessary to reach an asphalt grade is reduced by the addition of said non-polymeric ethylene polyamine.

6. The method according to claim 5 wherein for a fixed amount of copolymer, said polyamine is added in an amount to produce a final asphalt composition having an improved temperature range performance.

7. The method according to claim 1 wherein the final asphalt composition has a higher PG asphalt grade level than said first asphalt composition.

8. The process of claim 1 wherein the temperature of mixing said polyamine with said first asphalt composition is in the range from about 190° C. to about 250° C.

9. In a process for making an asphalt composition comprising mixing an asphalt base resulting from the distillation of crude oil having a viscosity in the range of 100–20,000 poise at 60° C. and a terpolymer derived from the concurrent reaction of ethylene, normal butyl acrylate, and a glycidyl ester selected from the group consisting of glycidyl acrylate and glycidyl methacrylate, wherein the glycidyloxy moieties in said terpolymer range from 0.1 to 20 weight % based on the total weight of said terpolymer, to produce a first asphalt composition comprising a polymer-linked-asphalt thermoplastic wherein the terpolymer content of said first asphalt composition is from 0.05 weight percent to 20 weight percent, based on the first asphalt composition, the improvement to produce an asphalt grade with less terpolymer, said improvement comprising:

admixing at a temperature in a range of from about 100° C. to about 250° C. and ambient pressure, a non-polymeric ethylene-polyamine having a weight average molecular weight of at least about 130 with said first asphalt composition, thereby producing a final asphalt composition comprising a highly-crosslinked polymer-polyamine asphalt wherein the weight ratio of terpolymer to polyamine is from about 20:1 to about 1:1.

10. The process of claim 9 wherein the weight ratio of terpolymer to polyamine is from about 10:1 to about 2:1.

11. The process of claim 9 wherein the weight ratio of terpolymer to polyamine is from about 7:1 to about 4:1.

12. The process of claim 9 wherein for a fixed amount of terpolymer, said polyamine is added in an amount to produce a final asphalt composition having an improved temperature range performance.

13. The method according to claim 9 wherein said polyamine is added in an amount to produce a final asphalt composition having a higher PG asphalt grade level than said first asphalt composition.

14. The process of claim 9 wherein the temperature of mixing said polyamine with said first asphalt composition is in the range from about 190° C. to about 250° C.

* * * * *